US007141772B2

(12) United States Patent
Jung et al.

(10) Patent No.: US 7,141,772 B2
(45) Date of Patent: Nov. 28, 2006

(54) THREE-DIMENSIONAL LOCATION MEASUREMENT SENSOR

(75) Inventors: Myungjin Jung, Seoul (KR); Seokwon Bang, Seoul (KR); Hyoungki Lee, Gyeonggi-do (KR); Iihwan Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 148 days.

(21) Appl. No.: 10/986,986

(22) Filed: Nov. 15, 2004

(65) Prior Publication Data

US 2005/0105076 A1 May 19, 2005

(30) Foreign Application Priority Data

Nov. 15, 2003 (KR) .............................. 2003-80825

(51) Int. Cl.
*G01C 21/02* (2006.01)
*G01C 3/08* (2006.01)
*G01B 11/14* (2006.01)

(52) U.S. Cl. .............................. 250/203.4; 250/203.5; 356/614; 356/4.01

(58) Field of Classification Search ............. 250/203.4, 250/203.5; 356/139.01, 139.02, 139.03, 356/139.04, 139.05, 147, 152.1, 221, 4.01, 356/4.02, 614
See application file for complete search history.

(56) References Cited

U.S. PATENT DOCUMENTS 3,063,332 A 11/1962 Fajans
3,575,512 A * 4/1971 Baboz ........................ 356/138
4,626,905 A 12/1986 Schmidt
4,886,330 A 12/1989 Linick
4,945,459 A 7/1990 Ferren et al.
5,796,474 A 8/1998 Squire et al.
RE36,653 E 4/2000 Heckel et al.
6,479,813 B1 11/2002 Takada et al.
D474,489 S 5/2003 Kawashima
6,793,415 B1 * 9/2004 Arbuckle .................... 396/427
2004/0042785 A1 * 3/2004 Watanabe et al. ........... 396/463

* cited by examiner

*Primary Examiner*—Georgie Epps
*Assistant Examiner*—Don Williams
(74) *Attorney, Agent, or Firm*—Staas & Halsey LLP

(57) ABSTRACT

A three-dimensional location measurement sensor including first and second rotation plates to rotate about a fixed axial member independently of each other, a camera, formed inside the fixed axial member in the middle of the second rotation plate, a mirror, to be supported by a mirror supporting unit so as to be disposed over the camera, the mirror supporting unit being fixed to the first rotation plate, at least one light source, to be supported by a light source supporting unit so as to be disposed between the mirror and the second rotation plate, the light source supporting unit being fixed to the first rotation plate, a mark, to be supported by a mark supporting unit so as to be disposed between the mirror and the second rotation plate, the mark supporting unit being formed on the second rotation plate, and a gear unit, which is formed at an outer circumference of the second rotation plate and adjusts an inclination angle of the mirror. Accordingly, relatively easily determining the location of a target object by using the three-dimensional location measurement sensor is possible.

31 Claims, 7 Drawing Sheets

THREE-DIMENSIONAL LOCATION MEASUREMENT SENSOR

CROSS-REFERENCE TO RELATED APPLICATION

This application claims the benefit of Korean Patent Application No. 2003-80825, filed on Nov. 15, 2003, in the Korean Intellectual Property Office, the disclosure of which is incorporated herein in its entirety by reference.

BACKGROUND OF THE INVENTION

1. Field of the Invention

The present invention relates to a three-dimensional location measurement sensor, which measures the location of a target object and the distance between the three-dimensional location measurement sensor and the target object, and a method of measuring the location of a target object and the distance between the three-dimensional location measurement sensor and the target object.

2. Description of the Related Art

Various location measurement methods and devices have been developed. Many conventional location measurement methods and devices use trigonometric methods to determine the location of an object by measuring the direction of the object with respect to a reference point and a distance between the object and the reference point. Recently, the importance of such location measurement methods and devices has gradually increased due to the development of home robots or high-speed mobile devices.

The location of an object with respect to the location of measurement sensor (hereinafter referred to as a reference point) may be expressed by using three location variables, which will be described more fully with reference to FIG. 1. Referring to FIG. 1, suppose that O is the reference point, A is a target object, $\Phi$ is an azimuth angle of the target object A when a location of the object A is projected on the xy plane, $\Psi$ is an inclination angle to represent the slope of a straight line between O and A. Lastly, r is a distance between O and A. Therefore, the location of the target object A may be determined by determining values of $\Phi$, $\Psi$, and r. The three location variables $\Phi$, $\Psi$, and r may vary together or independently of one another. Precisely determining the three location variables $\Phi$, $\Psi$, and r to determine the location of the target object is crucial.

The conventional location measurement devices are classified into two groups depending on how they determine the location of a target object. A first group of conventional location measurement devices determine the location of the target object by appropriately panning and/or tilting a distance measurement device or a camera. A second group of conventional location measurement devices determine the location of the target object by using beams that are reflected from a mirror.

A conventional location measurement device in the first group should drive a distance measurement device or a camera. Thus, the first group location measurement device requires a driving unit to generate a considerable amount of driving force. An additional characteristic of the first group location measurement device is that rotating the device at a high speed while determining the location of a target object is difficult.

An example of the conventional location measurement device in the first group is disclosed in U.S. Pat. No. D474489S (Cannon 2002). In U.S. Pat. No. D474489S, a driver is attached to one of a distance measurement device, an inclination angle control axis, or an azimuth angle control axis of a camera so that driving the distance measurement device or the camera in order to measure an azimuth angle may be performed independently of driving the distance measurement device or the camera in order to measure an inclination angle of the target object. However, the conventional location measurement device disclosed in U.S. Pat. No. D474489 cannot rotate indefinitely.

Another example of the conventional location measurement device is disclosed in U.S. Pat. No. 6,479,813. The ’813 patent teaches controlling an azimuth angle independently of an inclination angle. The ’813 patent also teaches that rotating indefinitely is possible due to a slip ring. However, when transmitting analog signals with the use of the slip ring, the analog signals may be distorted.

U.S. Pat. No. 4,886,330 discloses an infrared imaging system in which an azimuth angle and an inclination angle can be controlled using a single motor. The patented infrared imaging system, however, cannot set the azimuth angle and the inclination angle on the basis of an arbitrary location.

A conventional location measurement device in the second group measures the azimuth and inclination angles of a target object with respect to a reference location and the distance from the reference location to the target object by driving a mirror. With respect to these devices, even when the target object moves, the conventional location measurement device may determine the location of the target object because only a small portion of the conventional location measurement device is driven when determining the location of the target object.

An example of the conventional location measurement device is disclosed in U.S. Pat. No. 4,945,459 in which two motors are provided to control the azimuth and inclination angles of a corresponding conventional location measurement device independently of each other. However, miniaturizing the conventional location measurement device disclosed in the ’459 patent is relatively difficult because the conventional location measurement device needs to use a unique chain.

In short, the above-described conventional location measurement sensors (or devices) have the following disadvantages.

First, due to the limitations of a platform on which the conventional location measurement sensors are mounted, the conventional location measurement sensors cannot rotate within a range of 0–360 degrees. Therefore, a clear limit in determining the location of a target object that rotates more than 360 degrees exists.

Second, in some of the conventional location measurement sensors, an azimuth angle is dependent upon an inclination angle, and vice versa, in which case, precisely determining the distance from a reference location to a target object located in an arbitrary direction is substantially impossible.

Third, some conventional location measurement sensors use an omnidirectional mirror that provides a 360 degree field of view to a camera, in which case, the area of a region the camera needs to deal with increases resulting in a decrease in the resolution of an image of the region taken by the camera.

SUMMARY OF THE INVENTION

Therefore, the present invention provides a three-dimensional location measurement sensor, which may control devices to measure the directional angles of a target object with respect to the three-dimensional location measurement sensor (e.g., the azimuth angle and inclination angle of the target object with respect to the three-dimensional location measurement sensor) independently of one another and which may easily measure the distance that the target object moved even when the object moves at high speed, and a method to measure the location of a target object and the distance between the three-dimensional location measurement sensor and the target object.

According to an aspect of the present invention, a three-dimensional location measurement sensor comprises first and second rotation plates to rotate about a fixed axial member independently of each other, a camera, formed inside the fixed axial member in the middle of the second rotation plate, a mirror, to be supported by a mirror supporting unit so as to be disposed over the camera, the mirror supporting unit being fixed to the first rotation plate, at least one light source, to be supported by a light source supporting unit so as to be disposed between the mirror and the second rotation plate, the light source supporting unit being fixed to the first rotation plate, a mark, to be supported by a mark supporting unit so as to be disposed between the mirror and the second rotation plate, the mark supporting unit being formed on the second rotation plate, and a gear unit, which is formed at an outer circumference of the second rotation plate and adjusts an inclination angle of the mirror.

The first and second rotation plates may be connected to the fixed axial member by bearing gears so that they may rotate about the fixed axial member independently of each other. The first and second rotation plates may be respectively coupled to driving force transfer units of first and second motors and may be driven to rotate by the first and second motors.

The three-dimensional location measurement sensor further comprises: a first fixing plate, which is formed at one end of the fixed axial member, the first motor being formed on the first fixing plate; and a second fixing plate, which is formed between the first and second rotation plates, the second motor being formed on the second fixing plate.

Spindle motors, which are composed of coils, a magnet, and bearings and respectively formed at connections between the fixed axial member and the first rotation plate and between the fixed axial member and the second rotation plate, may drive the first and second rotation plates to rotate about the fixed axial member independently of each other.

The mirror supporting unit comprises: two mirror supporters, which are fixably formed at opposite sides of the top surface of the first rotation plate and vertically extend from the top surface of the first rotation plate; a mirror rotation axis, which is rotatably coupled to the two mirror supporters by bearings and horizontally supports the mirror; and a mirror rotation gear, which is coupled to one end of the mirror rotation axis and engages with the gear unit so that the mirror rotation gear may rotate the mirror rotation axis when the gear unit rotates. Thus, the mirror rotation gear may change an inclination angle of the mirror.

The light source supporting unit comprises: a vertical portion, which is fixably formed at one side of the top surface of the first rotation plate and vertically extends from the top surface of the first rotation plate; and a horizontal portion, which horizontally extends from one end of the vertical portion into a space between the mirror and the second rotation plate.

The at least one light source may be formed on the light supporting unit between the mirror and the second rotation plate.

The mark supporting unit comprises: a vertical portion, which is fixably formed at one side of the top surface of the first rotation plate and vertically extends from the top surface of the second rotation plate; and a horizontal portion, which horizontally extends from one end of the vertical portion into a space between the mirror and the second rotation plate.

The mark may be formed at an end of the horizontal portion of the mark supporting unit. The gear unit may be a crown gear formed along part of the outer circumference of the second rotation plate.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
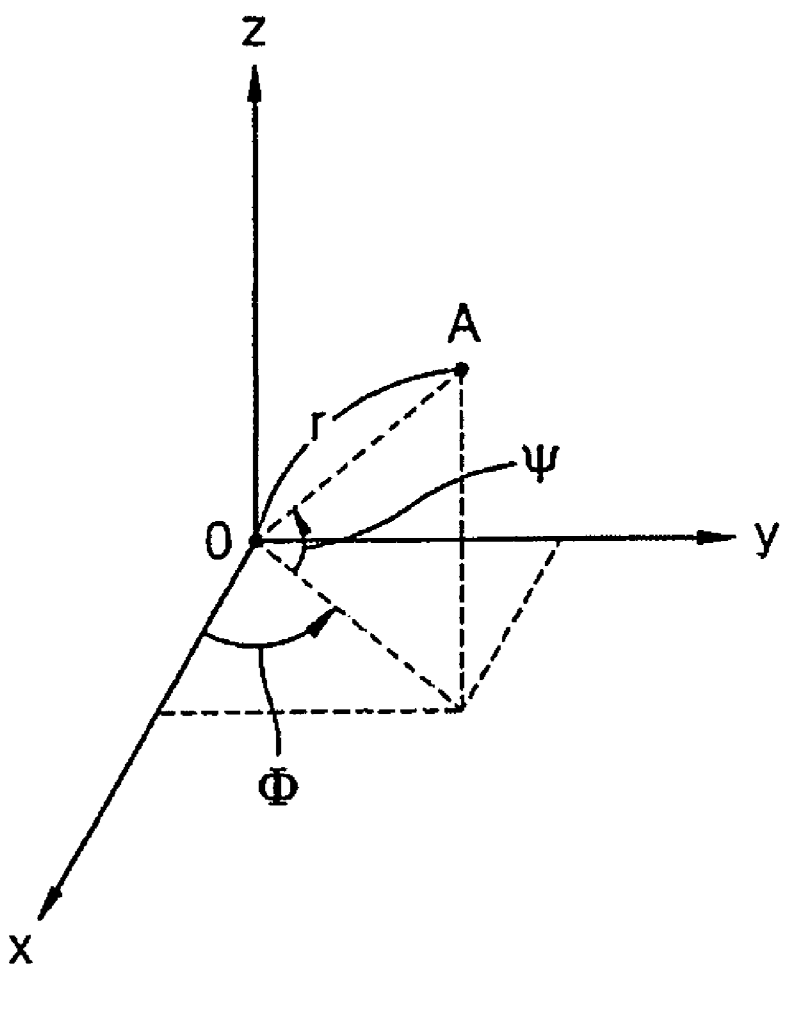
FIG. 1 is a diagram illustrating a coordinate system in which the azimuth angle and inclination angle of a target object with respect to a reference point (e.g., the location of a measurement sensor) and the distance between the reference point and the target object are illustrated.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2A:
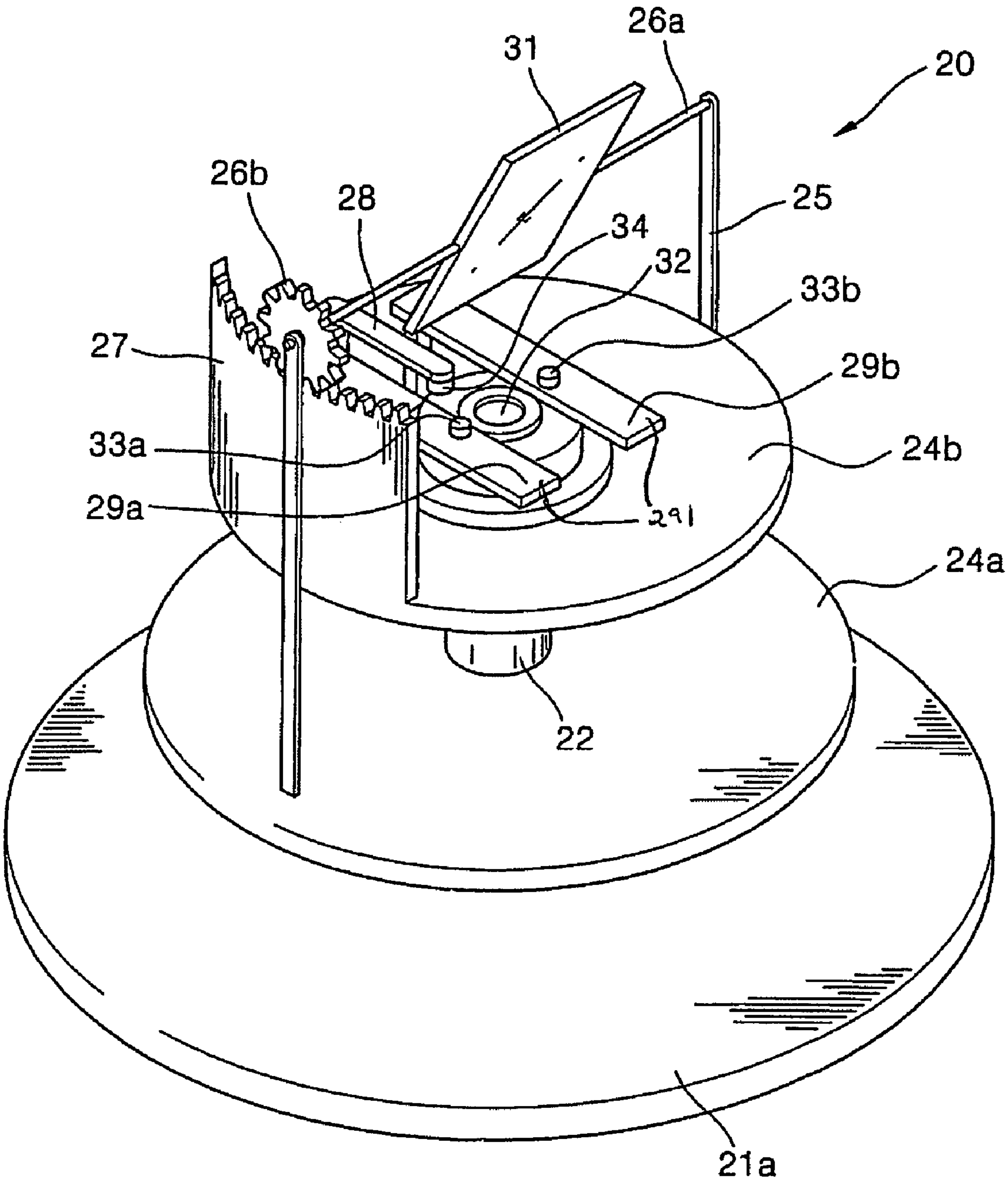
FIG. 2A is a perspective view of a three-dimensional location measurement sensor according to an exemplary embodiment of the present invention.
Figure 2B:
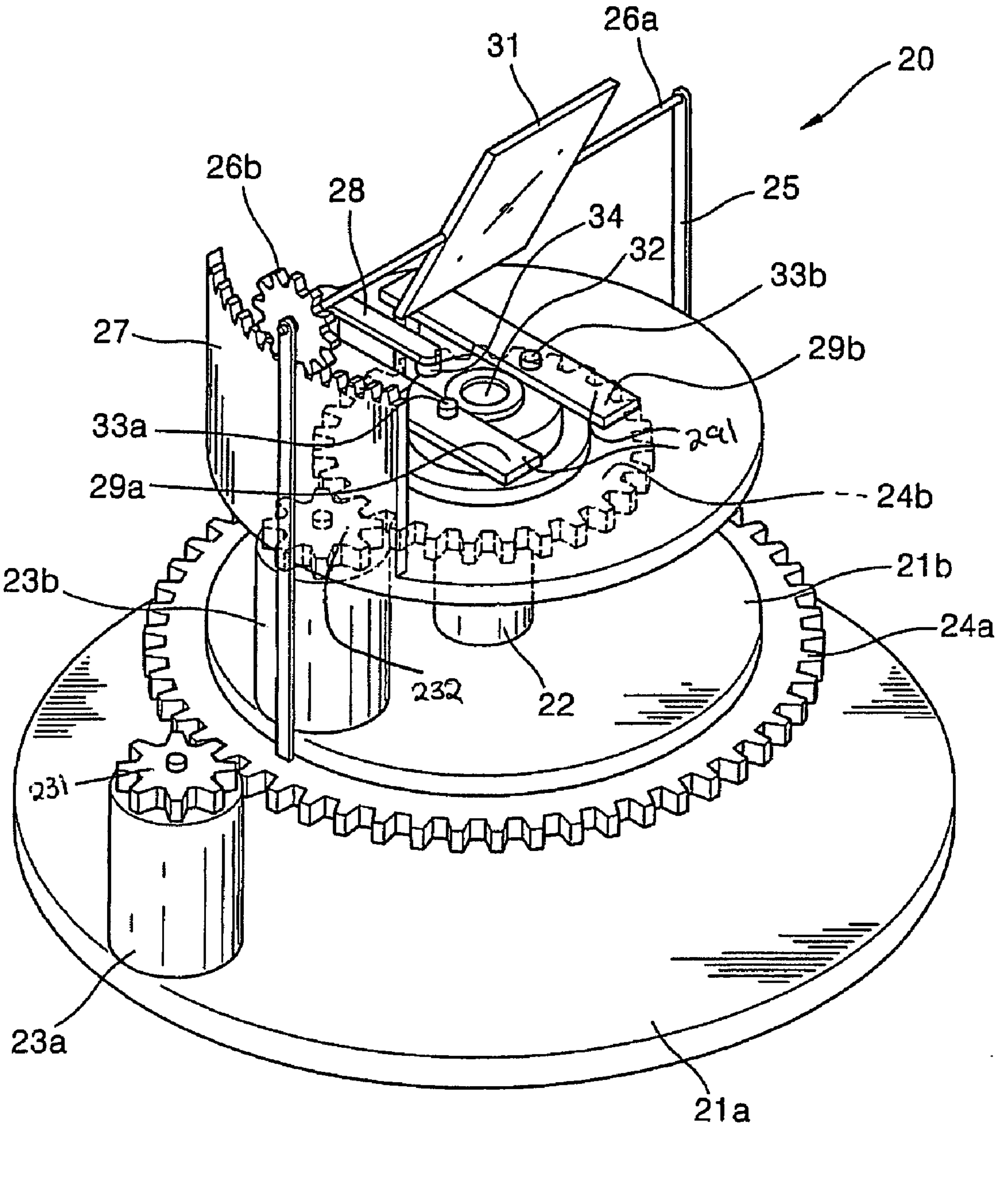
FIG. 2B is a perspective view of a three-dimensional location measurement sensor according to another exemplary embodiment of the present invention.
Figure 2C:
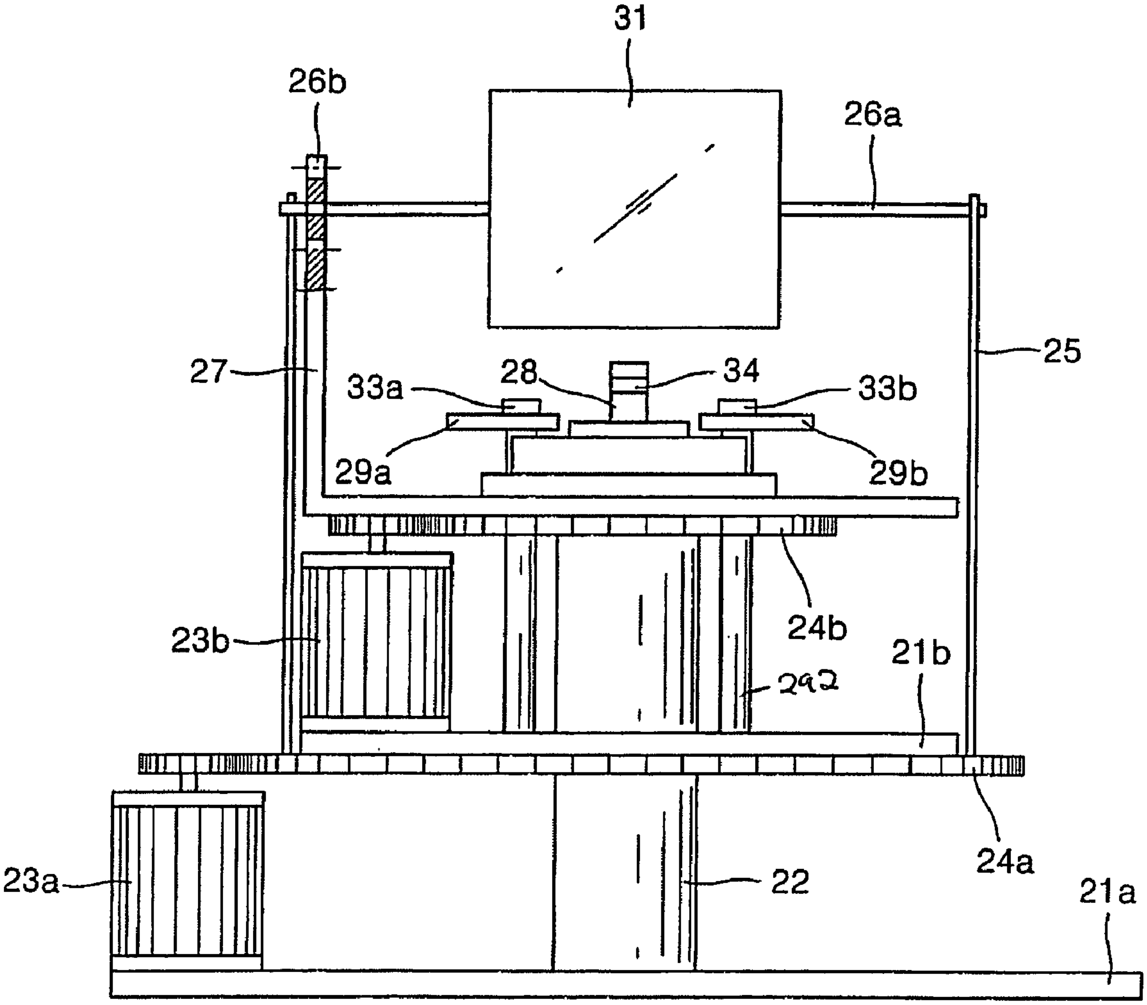
FIGS. 2C and 2D are a front view and a side view, respectively, of the three-dimensional location measurement sensor of FIG. 2B.
Figure 2D:
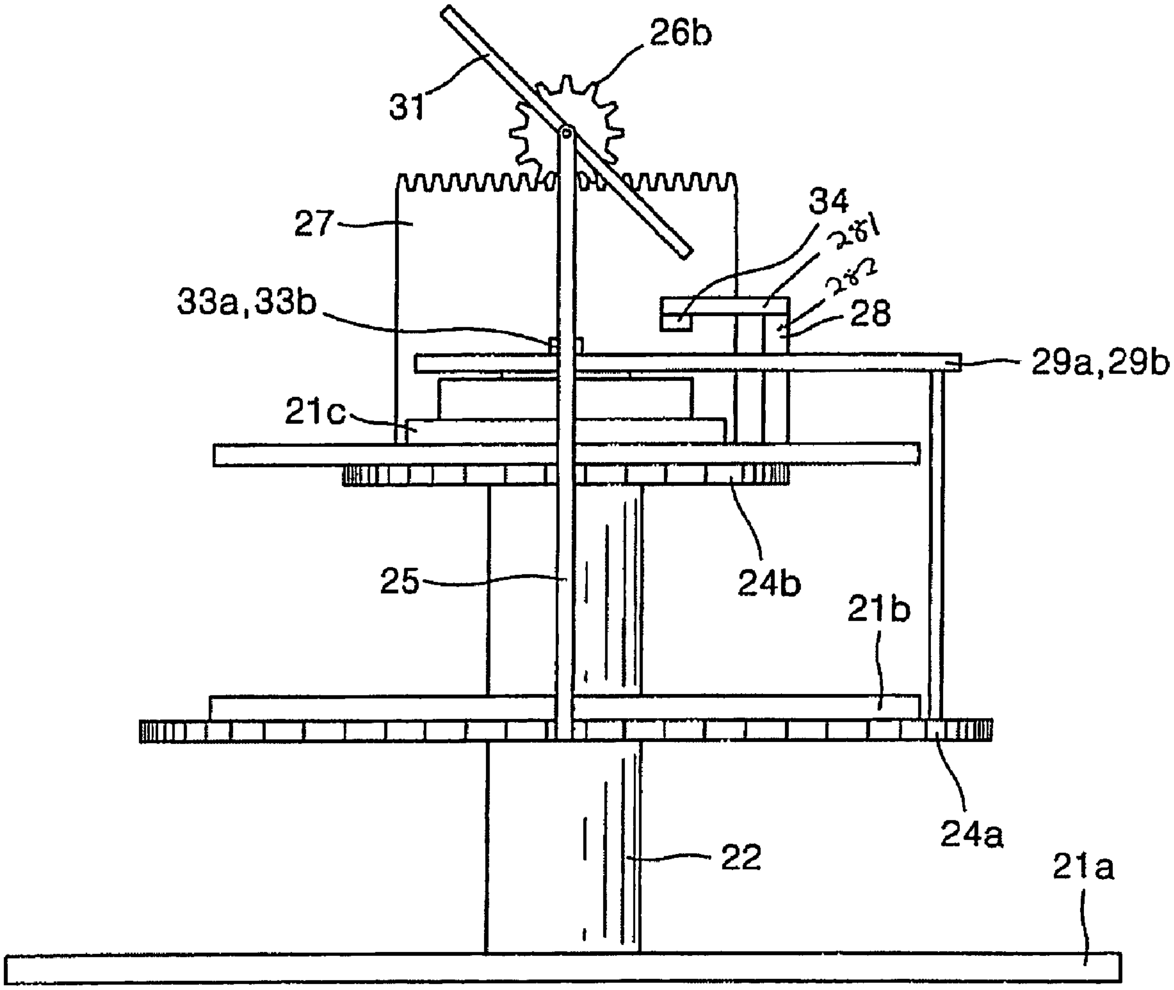

FIG. 2A is a perspective view of a three-dimensional location measurement sensor according to an exemplary embodiment of the present invention. FIG. 2B is a perspective view of a three-dimensional location measurement sensor according to another exemplary embodiment of the present invention. FIGS. 2C and 2D are a front view and a side view, respectively, of the three-dimensional location measurement sensor of FIG. 2B.

The three-dimensional location measurement sensor of FIG. 2A or 2B is divided into two blocks, i.e., a measurement block, which obtains an image reflected from the surface of a target object, and a driving unit, which drives the measurement block. The measurement block includes light sources 33*a* and 33*b*, which apply light to the target object, a mirror 31, which reflects light radiated from the light sources 33*a* and 33*b* toward the target object, and a camera 32, which takes an image of a reflection of the target object in the mirror 31. The driving unit includes mirror supporters 25, which support the mirror 31, light source supporting units 29*a* and 29*b*, which support the light sources 33*a* and 33*b*, first and second rotation plates 24*a* and 24*b*, a mirror rotation axis 26*a*, and a mirror rotation gear 26*b*, which may rotate the mirror unit 31 toward the target object.

The driving unit of the three-dimensional location measurement sensor of FIG. 2A or 2B will now be described in further detail with reference to FIGS. 2A through 2D. The first and second rotation plates 24*a* and 24*b* are formed to be rotatable independently of each other about a fixed axial member 22. The first and second rotation plates 24*a* and 24*b* are coupled to the fixed axial member 22 by bearings. The first and second rotation plates 24*a* and 24*b* have separate driving devices.

The first rotation plate 24*a* has a larger area than the second rotation plate 24*b*. The two mirror supporters 25 are formed on the top surface of the first rotation plate 24*a* to support the mirror 31. Specifically, the mirror supporters 25 are formed at opposite sides of the top surface of the first rotation plate 24*a* from each other and stand upright along the fixed axial member 22. The mirror rotation axis 26*a* is connected between the ends of the mirror supporters 25 and supports the mirror 31 together with the mirror supporters 25. Here, the mirror supporters 25 are formed on the top surface of the first rotation plate 24*a* vertically extending above the top surface of the second rotation plate 24*b*. As a result, the mirror 31 is supported by the mirror rotation axis 26*a* such that the mirror 31 floats above the second rotation plate 24*b* at a predetermined distance from the top surface of the second rotation plate 24*b*.

The light source supporting units 29*a* and 29*b*, which support the light sources 33*a* and 33*b*, respectively, are formed at locations on the top surface of the first rotation plate 24*a* that are separated from the locations at which the mirror supporters 25 are formed. The three-dimensional location measurement sensor of FIG. 2A or 2B may use one or more light sources. For example, the three-dimensional location measurement sensor of FIG. 2A or 2B uses two light sources. Each of the light source supporting units 29*a* and 29*b* comprises a vertical portion 292, which is formed on the top surface of the first rotation plate 24*a* and extends vertically from the top surface of the first rotation plate 24*a*, and a horizontal portion 291, which extends horizontally from an end of the vertical light source supporter into a space between the second rotation plate 24*b* and the mirror 31. The vertical portion 292 of each of the light source supporting units 29*a* and 29*b* is shorter than the mirror supporters 25 but longer than the distance between the first and second rotation plates 24*a* and 24*b*, so the horizontal portion 291 of each of the light source supporting units 29*a* and 29*b* may be interpolated between the second rotation plate 24*b* and the mirror 31.

A mark supporter 28 is formed at one side of the top surface of the second rotation plate 24*b*. The mark supporter 28, like the light source supporting units 29*a* and 29*b*, comprises a vertical portion 282, which vertically extends from the top surface of the second rotation plate 24*b*, and a horizontal portion 281, which horizontally extends from an end of the vertical portion into the space between the mirror 31 and the second rotation plate 24*b*. The horizontal portion 281 of the mark supporter 28 is formed to extend horizontally along the direction of the diameter of the second rotation plate 24*b*. The horizontal portion 281 of the mark supporter 28 is shorter than the diameter of the second rotation plate 24*b*. Specifically, the horizontal portion 281 of the mark supporter 28 is disposed under the mirror 31 and is formed to be much shorter than the horizontal portion 291 of each of the light source supporting units 29*a* and 29*b*. Accordingly, as shown in FIG. 2C, the horizontal portion 281 of the mark supporter 28 may be prevented from interfering with the rotation of the mirror 31.

A gear unit 27 is formed at another side of the top surface of the second rotation plate 24*b*. The mirror rotation gear 26*b*, which is connected between one of the mirror supporters 25 and the mirror rotation axis 26*a*, engages with the gear unit 27. The gear unit 27 adjusts the inclination angle of the mirror 31 and rotates the mirror 31 by rotating the mirror rotation gear 26*b* and transferring the driving force to the mirror 31 via the mirror rotation axis 26*a*. In an embodiment of the invention, the gear unit 27 may be formed as a crown gear.

As is described above, the first and second rotation plates 24*a* and 24*b* may rotate independently of each other. The three-dimensional location measurement sensor of FIG. 2B, unlike the three-dimensional location measurement sensor of FIG. 2A, further includes driving sources to rotate the first and second rotation plates 24*a* and 24*b*, i.e., an azimuth angle control motor 23*a* and an inclination angle control motor 23*b*. Typically, spindle motors, which are disclosed in, for example, U.S. Patent Publication No. 2003-6653, may be used as the azimuth angle control motor 23*a* and the inclination angle control motor 23*b*. For example, spindle motors, each including coils, a magnet, and bearings, may be formed in the middle of the first and second rotation plates 24*a* and 24*b*, particularly, in the middle of the fixed axial member 22, in which case, forming fixing plates to fix the spindle motors to the three-dimensional location measurement sensor of FIG. 2A or 2B is not required.

Referring to FIG. 2B, the three-dimensional location measurement sensor further includes first and second motors 23*a* and 23*b* to rotate the first and second rotation plates 24*a* and 24*b*, respectively. The first motor 23*a* is formed on a first fixing plate 21*a*, which is fixed to a lower portion of the fixed axial member 22, and transfers driving force to the first rotation plate 24*a*. The first motor 23*a* is connected to the first rotation plate 24*a* via a driving force transfer unit 231, which engages with the first rotation plate 24*a*. Thus, the first motor 23*a* may rotate the first rotation plate 24*a* by transferring driving force to the first rotation plate 24*a* via the driving force transfer unit 231 thereof. The second motor 23*b* is formed on a second fixing plate 23*b*, which is formed on the first rotation plate 24*a* and is fixed to the fixed axial member 22. The second motor 23*b*, like the first motor 23*a*, is connected to the second rotation plate 24*b* via a driving force transfer unit 232, which engages with the second rotation plate 24*b*. Thus, the second motor 23*b* may rotate the second rotation plate 24*b* by transferring driving force to the second rotation plate 24*b* via the driving force transfer unit 232 thereof.

In an embodiment of the invention, the first motor 23*a* serves as an azimuth angle control motor, and the second motor 23*b* serves as an inclination angle control motor. The azimuth angle control motor 23*a* measures the azimuth angle of a target object with respect to the location of the three-dimensional location measurement sensor of FIG. 2A or 2B (hereinafter referred to as reference point) by rotating the light sources 33*a* and 33*b* and the mirror 31 toward the target object. The inclination angle control motor 23*b* adjusts the inclination angle of the mirror 31 with respect to the reference point by rotating the second rotation plate 24*b*, which will be described later in further detail.

The measurement block of the three-dimensional location measurement sensor of FIG. 2A or 2B will be described in detail in the following with reference to FIGS. 2A through 2D.

A camera 32 is formed in the middle of the fixed axial member 22 coupled to a third fixing plate 21*c*. The camera 32 is formed inside the fixed axial member 22 and receives an image of the target object reflected from the mirror 31. The first and second light sources 33*a* and 33*b* are formed on the first and second light source supporting units 29*a* and 29*b*, respectively, which vertically extend from the top surface of the first rotation plate 24*a* and then horizontally extend above the third fixing plate 21*c*. The mark supporter 28 is fixably formed on the second rotation plate 24*b*. A mark 34 is formed on a lower surface of the horizontal portion of the mark supporter 28 and faces the second rotation plate 24*b*.

The light sources 33*a* and 33*b* are typical light sources, for example, light emitting diodes (LEDs). Electrodes (not shown) are formed at the light source supporting units 29*a* and 29*b* and at an interface among the light supporting units 29*a* and 29*b*, the first rotation plate 24*a*, and the second fixing plate 21*b* in order to drive the light sources 33*a* and 33*b* to emit light. The mirror 31 is coupled to a middle portion of the mirror rotation axis 26*a*. The mirror 31 is placed over the camera 32, the first and second light sources 33*a* and 33*b*, and the mark 34. In an embodiment of the invention, the mark 34, which determines the inclination angle of the mirror 31, is located under one side of the mirror 31 so that an image of the mark may be placed in a marginal area of an image of the target object taken by the camera 32.

The operation of the three-dimensional location measurement sensor of FIG. 2A or 2B will now be described in more detail. When the three-dimensional location measurement sensor of FIG. 2A or 2B drives the azimuth angle control motor 23*a*, the first rotation plate 24*a* rotates, and the mirror supporters 25 formed on the first rotation plate 24*a* also rotate. Due to the rotation of the mirror supporters 25, the mirror rotation axis 26*a* rotates so as to cause the mirror 31 to rotate as well. When the first rotation plate 24*a* rotates, the first and second light source supporting units 29*a* and 29*b*, formed on the first rotation plate 24*a*, rotate together with the first rotation plate 24*a*. In short, the three-dimensional location measurement sensor of FIG. 2A or 2B controls the azimuth angle of the mirror 31 by driving the azimuth angle control motor 23*a*. Thus, the three-dimensional location measurement sensor of FIG. 2A or 2B changes the directions of the mirror 31 and the first and second light sources 33*a* and 33*b* and determines the azimuth angle Φ of the target object with respect to the reference point by driving the azimuth angle control motor 23*a*.

When the three-dimensional location measurement sensor of FIG. 2A or 2B drives the inclination angle control motor 23*b*, the second rotation plate 24*b* rotates, and the gear unit 27 rotates along with the second rotation plate 24*b*. Accordingly, the mirror rotation gear 26*b*, which engages with the gear unit 27, rotates together with the gear unit 27 so as to rotate the mirror 31 as well. Therefore, the three-dimensional location measurement sensor of FIG. 2A or 2B changes the inclination angle of the mirror 31 by driving the inclination angle control motor 23*b*. The location of the mark 34 varies in accordance with the rotation of the mirror 31. In short, the three-dimensional location measurement sensor of FIG. 2A or 2B determines the inclination angle Ψ of the target object with respect to the reference point by driving the inclination angle control motor 23*b*.

Figure 3A:
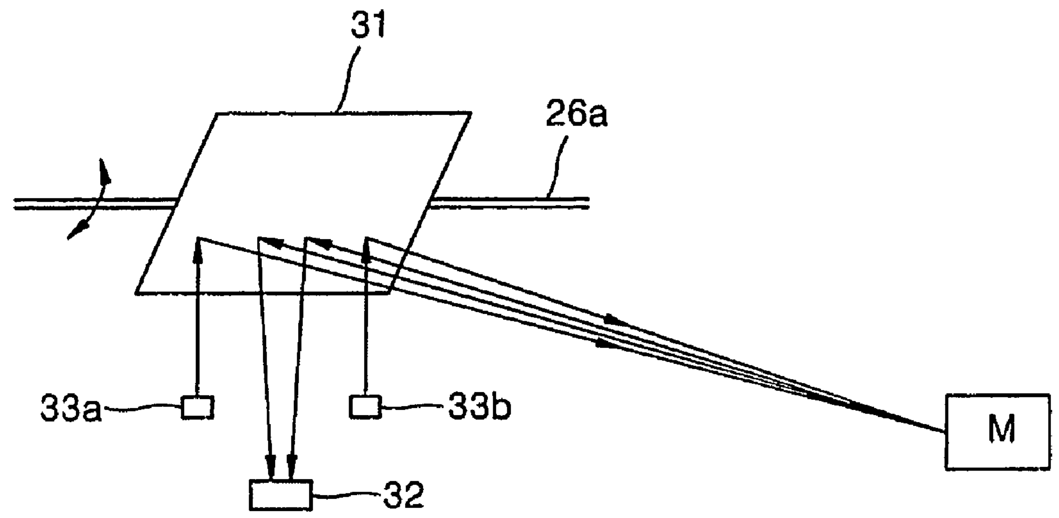
FIG. 3A is a schematic view illustrating a process of obtaining an image by applying light to a target object M with the use of the three-dimensional location measurement sensor of FIG. 2A or 2B.
Figure 3B:
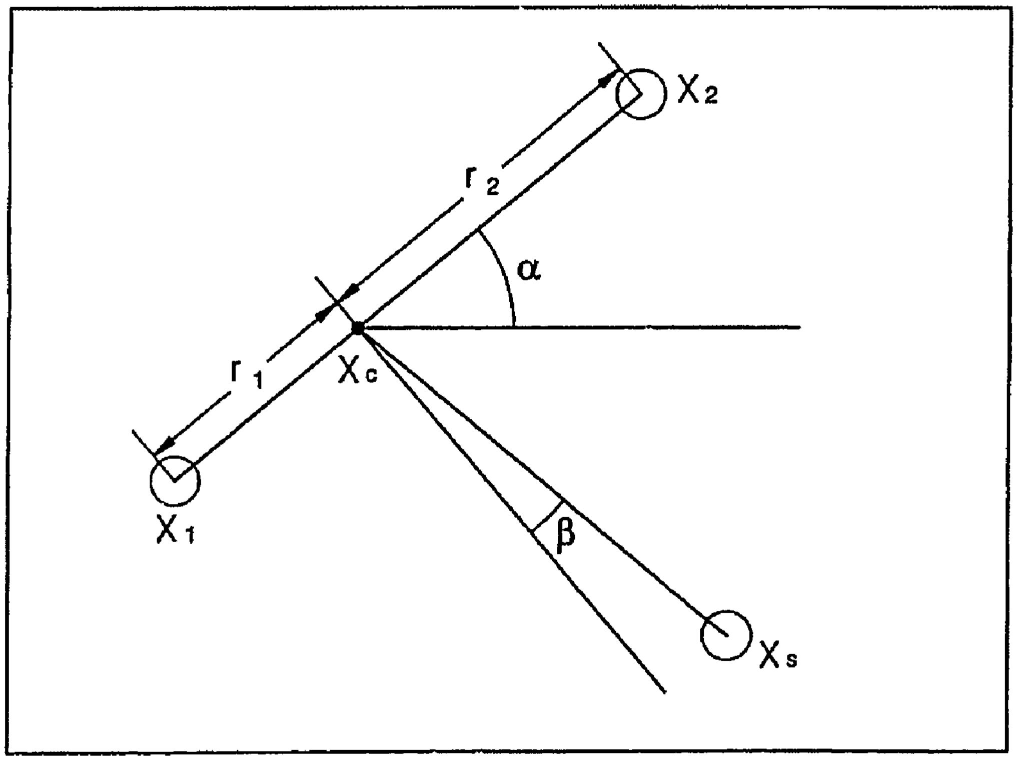
FIG. 3B is an image to analyze the location of the target object M determined by the three-dimensional location measurement sensor of FIG. 2A or 2B.

A three-dimensional location measurement method of the three-dimensional location measurement sensor of FIG. 2A or 2B will now be described in more detail. FIG. 3A is a schematic view illustrating a process of obtaining an image by applying light to a target object M with the use of the three-dimensional location measurement sensor of FIG. 2A or 2B, and FIG. 3B is an image to analyze the location of the target object M determined by the three-dimensional location measurement sensor of FIG. 2A or 2B.

The inclination angle of the measurement block of the three-dimensional location measurement sensor of FIG. 2A or 2B is adjusted so that the measurement block of the three-dimensional location measurement sensor of FIG. 2A or 2B faces the target object M. Then, light is emitted from the light sources 33*a* and 33*b*. The light emitted from the light sources 33*a* and 33*b* is reflected by the mirror 31 and then applied to the target object M. The reflection of the target object M in the mirror 31 is input to the camera 32. Then, the camera 32 records an image of the target M. The image of the reflection of the target object M, taken by the camera 32, is illustrated in FIG. 3B. In order to obtain the image of the reflection of the target object M, the three-dimensional location measurement sensor of FIG. 2A or 2B rotates the mirror 31 and the first and second light sources 33*a* and 33*b* to face the target object M by driving the azimuth angle control motor 23*a*. Thereafter, the three-dimension location measurement sensor of FIG. 2A or 2B determines the azimuth angle of the target object M with respect to the reference point. In addition, the three-dimensional location measurement sensor of FIG. 2A or 2B adjusts the inclination angle of the mirror 31 by driving the inclination angle control motor 23*b* so that the camera may record an image of the mark 34 together with the image of the reflection of the target object M at the same time. Thereafter, the three-dimensional location measurement sensor of FIG. 2A or 2B determines the inclination angle of the target object M with respect to the reference point.

Figure 3C:
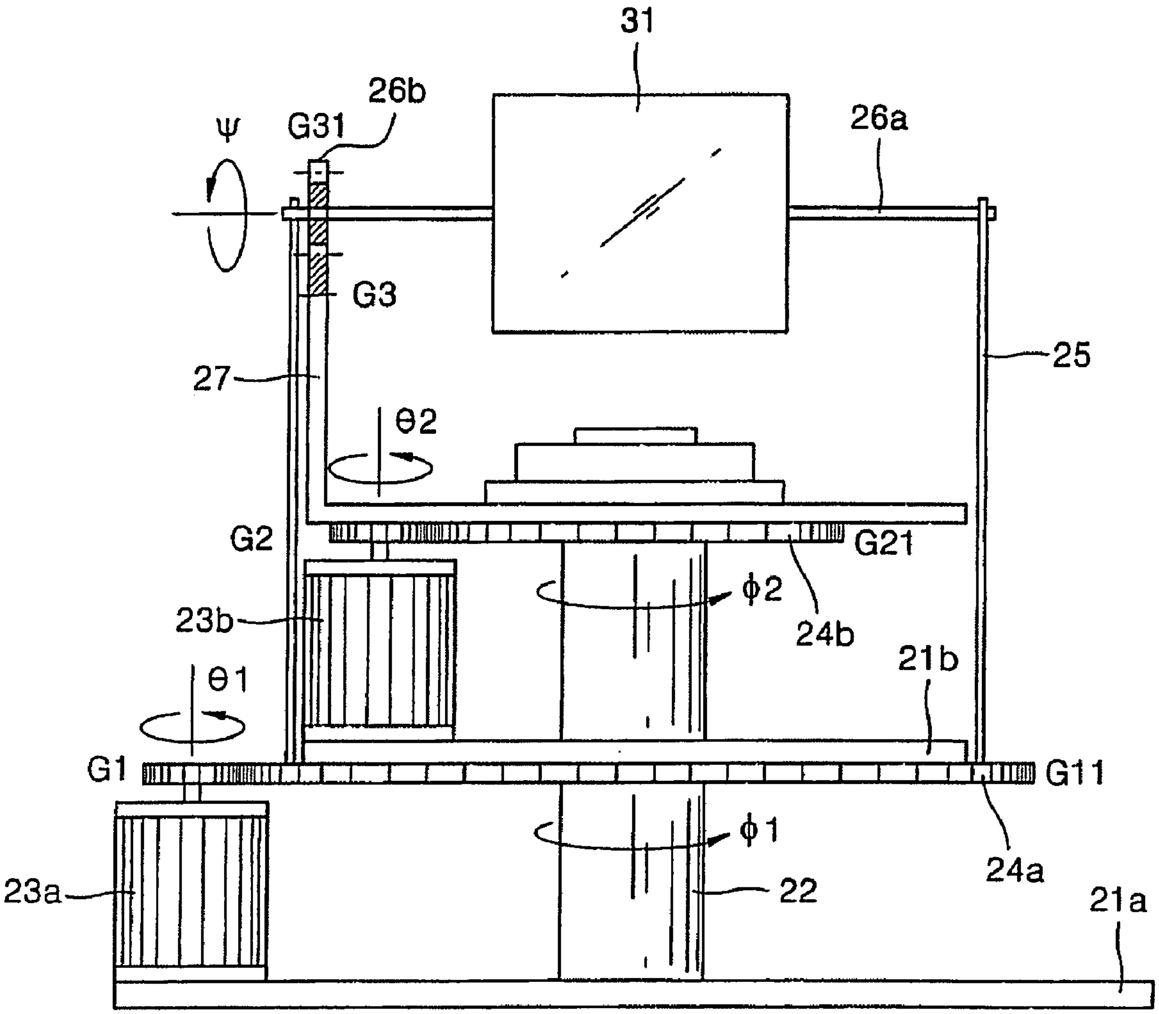
FIG. 3C is a diagram illustrating variables that are required to analyze the location of the target object M determined by the three-dimensional location measurement sensor of FIG. 2B.

The determination of the azimuth and inclination angles of the target object M with respect to the reference point will be described more fully with reference to FIG. 3C. FIG. 3C is a diagram illustrating variables required to analyze the location of the target object M determined by the three-dimensional location measurement sensor of FIG. 2B.

The azimuth angle Φ of the target object M with respect to the reference point is determined by Equation (1):

$$\Phi = \Phi_1 = a\theta_1 = -\frac{G_1}{G_{11}}\theta_1, \tag{1}$$

where θ1 is the rotation angle of a rotation axis of the azimuth angle control motor 23*a*, a is a constant, G1 is the number of teeth of a pinion gear formed at the rotation axis of the azimuth angle control motor 23*a*, and G11 is the number of teeth of a pinion gear formed at one side of the first rotation plate 24*a*.

The inclination angle Ψ of the target object M with respect to the reference point is determined by Equation (2):

$$\Psi = b\theta_1 + c\theta_2 \tag{2},$$

where θ2 is the rotation angle of a rotation axis of the inclination angle control motor 23*b*, and b and c are constants. The three-dimensional location measurement sensor of FIG. 2B interprets the image of the reflection of the target object in the mirror 32, taken by the camera 32.

Referring to FIG. 3B, Xc is the center of an image taken by the camera 32, X1 is a point at which light that is emitted from the first light source 33*a*, reflected toward the target object M by the mirror 31, reflected toward the mirror by the target object M, and then reflected toward the camera 32 by the mirror 31 is focused, X2 is a point at which light that is emitted from the second light source 33*b*, reflected toward the target object M by the mirror 31, reflected toward the mirror by the target object M, and then reflected toward the camera 32 by the mirror 31 is focused, and Xs is a point at which the mark 34 is focused. The image taken by the camera 32 is interpreted by using principles of a position sensitive detector (PSD).

According to the principles of the PSD, a distance between the first light source 33*a* and the target object M is determined to be inversely proportional to a distance r1 between X1 and Xc. Likewise, a distance between the second light source 33*b* and the target object M is determined to be inversely proportional to a distance r2 between X2 and Xc. The azimuth angle Ψ of the target object M with respect to the reference point is determined as an angle α that a straight line between X1 and X2 forms with a horizontal line. The angle α is expressed by Equation (3):

$$\alpha = -a\theta_1 = \frac{G_1}{G_{11}}\theta_1. \tag{3}$$

The inclination angle Ψ of the target object M with respect to the reference point is expressed by Equation (4):

$$\Psi = d\beta \tag{4},$$

where d is a constant, and β is an angle that a normal line to the straight line between X1 and X2 at Xc forms with a straight line between Xc and Xs. Equation (4) may be rearranged into Equation (4a) with reference to Equation (2) and FIG. 3C:

$$\begin{aligned}\Psi &= d\beta \\ &= -\frac{G_3}{G_{31}}\beta \\ &= -\frac{G_3}{G_{31}}(\phi_1 - \phi_2) \\ &= \left(\frac{G_3}{G_{31}}\right)\left(\frac{G_1}{G_{11}}\right)\theta_1 - \left(\frac{G_3}{G_{31}}\right)\left(\frac{G_2}{G_{21}}\right)\theta_2 \\ &= b\theta_1 + c\theta_2\end{aligned} \tag{4a}$$

where ϕ1 is the rotation angle of the first rotation plate 24*a*, i.e., the azimuth angle of the first rotation plate 24*a*, ϕ2 is the rotation angle of the second rotation plate 24*b*, i.e., the azimuth angle of the second rotation plate 24*b*, G2 is the number of teeth of a pinion gear formed at the rotation axis of the second rotation plate 24*b*, G21 is the number of teeth of a pinion gear formed at one side of the second rotation plate 24*b*, G3 is the number of teeth of the gear unit 27, G31 is the number of teeth of the mirror rotation gear 26*b*, and b and c are constants.

Therefore, all factors to determine the location of the target object M, i.e., the distance r between the target object M and the reference point, the azimuth angle Φ of the target object M with respect to the reference point, and the inclination angle Ψ of the target object M with respect to the reference point, may be determined.

According to the present invention, relatively easily determining the location of a target object by using a three-dimensional location measurement sensor, which can control its azimuth and inclination angles independently of each other and has a relatively simple structure, is possible. The three-dimensional location measurement sensor may be applied to various mobile devices, such as home robots or means of transportation, so that the three-dimensional location measurement sensor may relatively easily detect coordinates of the target object.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A three-dimensional location measurement sensor comprising:

first and second rotation plates to rotate about a fixed axial member independently of each other;

a camera, formed inside the fixed axial member in the middle of the second rotation plate;

a mirror, supported by a mirror supporting unit so as to be disposed over the camera, the mirror supporting unit being fixed to the first rotation plate;

at least one light source, supported by a light source supporting unit so as to be disposed between the mirror and the second rotation plate, the light source supporting unit being fixed to the first rotation plate;

a mark, supported by a mark supporting unit so as to be disposed between the mirror and the second rotation plate, the mark supporting unit being formed on the second rotation plate; and a gear unit, formed at an outer circumference of the second rotation plate, to adjust an inclination angle of the mirror.

2. The three-dimensional location measurement sensor of claim 1, wherein the first and second rotation plates are connected to the fixed axial member by bearing gears so that the first and second rotation plates are able to rotate about the fixed axial member independently of each other.

3. The three-dimensional location measurement sensor of claim 2, wherein the first and second rotation plates are respectively coupled to driving force transfer units of first and second motors and are driven to rotate by the first and second motors.

4. The three-dimensional location measurement sensor of claim 3, further comprising:

a first fixing plate, formed at one end of the fixed axial member, the first motor being formed on the first fixing plate; and a second fixing plate, formed between the first and second rotation plates, the second motor being formed on the second fixing plate.

5. The three-dimensional location measurement sensor of claim 2, wherein spindle motors, including coils, a magnet, and bearings, are respectively formed at connections between the fixed axial member and the first rotation plate and between the fixed axial member and the second rotation plate, drive the first and second rotation plates to rotate about the fixed axial member independently of each other.

6. The three-dimensional location measurement sensor of claim 1, wherein the mirror supporting unit comprises:

two mirror supporters to be fixably formed at opposite sides of the top surface of the first rotation plate and to vertically extend from the top surface of the first rotation plate;

a mirror rotation axis to be rotatably coupled to the two mirror supporters by bearings and to horizontally support the mirror; and a mirror rotation gear to be coupled to one end of the mirror rotation axis to engage with the gear unit so as to rotate the mirror rotation axis when the gear unit rotates and to change an inclination angle of the mirror.

7. The three-dimensional location measurement sensor of claim 1, wherein the light source supporting unit comprises:

a vertical portion, fixably formed at one side of the top surface of the first rotation plate, so as to vertically extends from the top surface of the first rotation plate; and a horizontal portion, to horizontally extend from one end of the vertical portion into a space between the mirror and the second rotation plate.

8. The three-dimensional location measurement sensor of claim 7, wherein the at least one light source is formed on the light supporting unit between the mirror and the second rotation plate.

9. The three-dimensional location measurement sensor of claim 1, wherein the mark supporting unit comprises:

a vertical portion fixably formed at one side of the top surface of the first rotation plate and to vertically extend from the top surface of the second rotation plate; and a horizontal portion to horizontally extend from one end of the vertical portion into a space between the mirror and the second rotation plate.

10. The three-dimensional location measurement sensor of claim 9, wherein the mark is formed at an end of the horizontal portion of the mark supporting unit.

11. The three-dimensional location measurement sensor of claim 1, wherein the gear unit is a crown gear that is formed along part of the outer circumference of the second rotation plate.

12. A three-dimensional location measurement sensor, including a camera, comprising:

first and second rotation plates to independently rotate about a fixed axial member in which the camera is held;

a mirror, supported by a mirror supporting unit so as to be disposed over the camera, the mirror supporting unit to rotate with the first rotation plate;

at least one light source, supported by a light source supporting unit so as to be disposed between the mirror and the second rotation plate, the light source supporting unit to rotate with the first rotation plate;

a mark, supported by a mark supporting unit so as to be disposed between the mirror and the second rotation plate, the mark supporting unit being formed on the second rotation plate; and a gear unit, which is formed at an outer circumference of the second rotation plate and adjusts an inclination angle of the mirror.

13. The three-dimensional location measurement sensor according to claim 12, further comprising bearing gears to allow the first and second rotation plates to connect to and independently rotate about the axial member.

14. The three-dimensional location measurement sensor according to claim 13, further comprising:

first and second motors to generate a driving force to be applied to the first and second rotation plates, respectively; and driving force transfer units to couple the first and second motors to the first and second rotation plates, respectively, so as to allow the generated driving force to be applied to the first and second rotation plates.

15. The three-dimensional location measurement sensor according to claim 14, wherein the fixed axial member has a lower end and an upper end, the camera being disposed in the upper end and the lower end being below the upper end.

16. The three-dimensional location measurement sensor according to claim 15, further comprising a first fixed plate at the lower end of the fixed axial member, wherein the first motor is fixed to the first fixed plate.

17. The three-dimensional location measurement sensor according to claim 16, further comprising a second fixed plate between the first and second rotation plates, wherein the second motor is fixed to the second fixing plate.

18. The three-dimensional location measurement sensor according to claim 13, further comprising spindle motors to respectively drive the first and second rotation plates to rotate about the fixed axial member independently of each other.

19. The three-dimensional location measurement sensor according to claim 18, wherein the spindle motors each comprise coils, a magnet, and bearings and are formed at connections between the fixed axial member and the first and second rotation plates.

20. The three-dimensional location measurement sensor according to claim 12, wherein the mirror supporting unit comprises two mirror supporters, to be fixably formed at opposite sides of the top surface of the first rotation plate, so as to vertically extend from the top surface of the first rotation plate.

21. The three-dimensional location measurement sensor according to claim 20, wherein the mirror supporting unit further comprises a mirror rotation axis rotatably coupled to the two mirror supporters by bearings so as to and horizontally support the mirror.

22. The three-dimensional location measurement sensor according to claim 21, wherein the mirror supporting unit further comprises a mirror rotation gear, coupled to one end of the mirror rotation axis to engage with the gear unit so as to rotate the mirror rotation axis when the gear unit rotates and to change an inclination angle of the mirror.

23. The three-dimensional location measurement sensor according to claim 12, wherein the light source supporting unit comprises:

a vertical portion fixably formed at one side of the top surface of the first rotation plate so as to vertically extends from the top surface of the first rotation plate; and a horizontal portion to horizontally extend from one end of the vertical portion into a space between the mirror and the second rotation plate.

24. The three-dimensional location measurement sensor according to claim 23, wherein the at least one light source is formed on the light supporting unit between the mirror and the second rotation plate.

25. The three-dimensional location measurement sensor according to claim 12, wherein the mark supporting unit comprises:

a vertical portion to be fixably formed at one side of the top surface of the first rotation plate and to vertically extend from the top surface of the second rotation plate; and a horizontal portion to horizontally extend from one end of the vertical portion into a space between the mirror and the second rotation plate.

26. The three-dimensional location measurement sensor according to claim 25, wherein the mark is formed at an end of the horizontal portion of the mark supporting unit.

27. The three-dimensional location measurement sensor according to claim 12, wherein the gear unit is a crown gear that is formed along part of the outer circumference of the second rotation plate.

28. A three-dimensional location measurement sensor, including a camera, comprising:

first and second rotation plates to independently rotate about a fixed axial member in which the camera is held;

a mirror disposed over the camera to rotate with the first rotation plate;

at least one light source between the mirror and the second rotation plate, the light source supporting unit to rotate with the first rotation plate;

a mark, between the mirror and the second rotation plate, to be integrally coupled to the second rotation plate and to serve as a reference point to determine an inclination angle of the mirror; and a gear unit formed integrally with the second rotation plate to adjust the inclination angle of the mirror.

29. A three-dimensional location measurement sensor, which can control its azimuth and inclination angles independently of each other, including a camera, comprising:

first and second rotation plates to independently rotate about a fixed axial member in which the camera is held;

a mirror disposed over the camera to rotate with the first rotation plate;

at least one light source between the mirror and the second rotation plate, the light source supporting unit to rotate with the first rotation plate;

a mark, between the mirror and the second rotation plate, integrally coupled to the second rotation plate and to serve as a reference point to determine an inclination angle of the mirror; and a gear unit formed integrally with the second rotation plate to adjust the inclination angle of the mirror.

30. A three-dimensional location measurement sensor, including a camera, to be applied to a mobile device so that the azimuth and inclination angles of the mobile device are controlled independently so that the device may relatively easily detect coordinates of a target, the three-dimensional location measurement sensor comprising:

first and second rotation plates to independently rotate about a fixed axial member in which the camera is held, the first rotation plate changing the azimuth angle of the device;

a mirror disposed over the camera to rotate with the first rotation plate;

at least one light source between the mirror and the second rotation plate, the light source supporting unit to rotate with the first rotation plate;

a mark, between the mirror and the second rotation plate, integrally coupled to the second rotation plate and to serve as a reference point to determine an inclination angle of the mirror; and a gear unit formed integrally with the second rotation plate to adjust the inclination angle of the mirror without further affecting the azimuth angle of the device.

31. A method of determining a location of a target in three-dimensions, comprising:

rotating a camera from an initial attitude to face a target in any direction in a horizontal plane;

adjusting an inclination angle of a mirror from an initial inclination to face the target in any direction in a vertical plane;

emitting light from positions near the camera toward the mirror so that the light is reflected toward the target and back to the camera via the mirror;

recording the image of the target; and determining the location of the target based on the amount of rotation of the camera and the amount of the adjustment of the inclination of the mirror when the camera records the reflection of the target.

* * * * *